United States Patent [19]
Blundell et al.

[11] 4,255,660
[45] Mar. 10, 1981

[54] DETECTORS OF PENETRATING RADIATION

[75] Inventors: Stephen J. Blundell, Hayes; Charles W. Turner, Virginia Water, England

[73] Assignee: EMI Limited, England

[21] Appl. No.: 931,253

[22] Filed: Aug. 4, 1978

[30] Foreign Application Priority Data

Aug. 5, 1977 [GB] United Kingdom ............... 32877/77

[51] Int. Cl.³ .............................................. G01T 1/22
[52] U.S. Cl. .................................................... 250/370
[58] Field of Search ............... 250/252, 338, 340, 370, 250/371

[56] References Cited

U.S. PATENT DOCUMENTS

| | | | |
|---|---|---|---|
| 3,778,614 | 12/1973 | Hounsfield | 250/362 |
| 3,924,129 | 2/1975 | LeMay | 250/336 |
| 3,949,210 | 4/1976 | Eichinger et al. | 250/370 |
| 4,028,548 | 6/1977 | Scott | 250/338 |
| 4,045,675 | 8/1977 | Kingsley et al. | 250/370 |
| 4,078,178 | 3/1978 | Lowes | 250/252 |

FOREIGN PATENT DOCUMENTS 1054084  1/1967 United Kingdom.

*Primary Examiner*—Smith Alfred E.
*Assistant Examiner*—Janice A. Howell
*Attorney, Agent, or Firm*—Cooper, Dunham, Clark, Griffin & Moran

[57] ABSTRACT

The invention relates to detectors of penetrating radiation, in particular x-radiation. The detector comprises a photoconductive material to which two electrical signals are applied. An output signal is detected and in the presence of radiation incident on the detector this includes a component formed by mixing of the two input signals, an harmonic if they are of the same frequency. The amplitude of that component is proportional to the intensity of the incident radiation. There is also a background component which should either be reduced to insignificant proportions or removed. Advantageous electrode arrangements for such a device are also disclosed.

27 Claims, 7 Drawing Figures

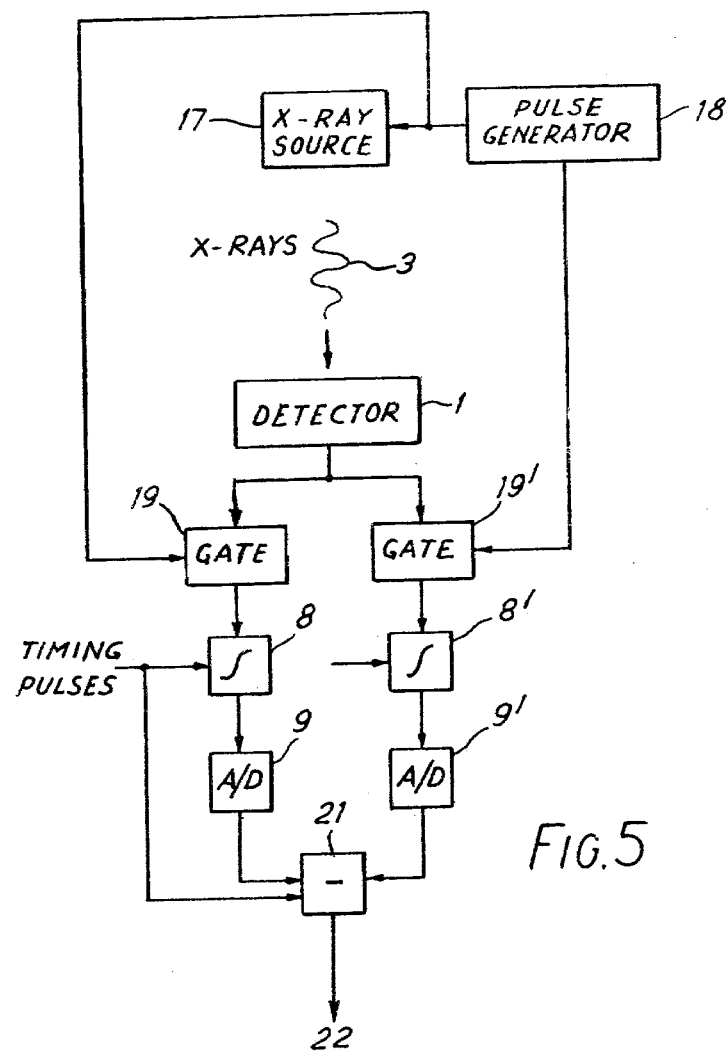

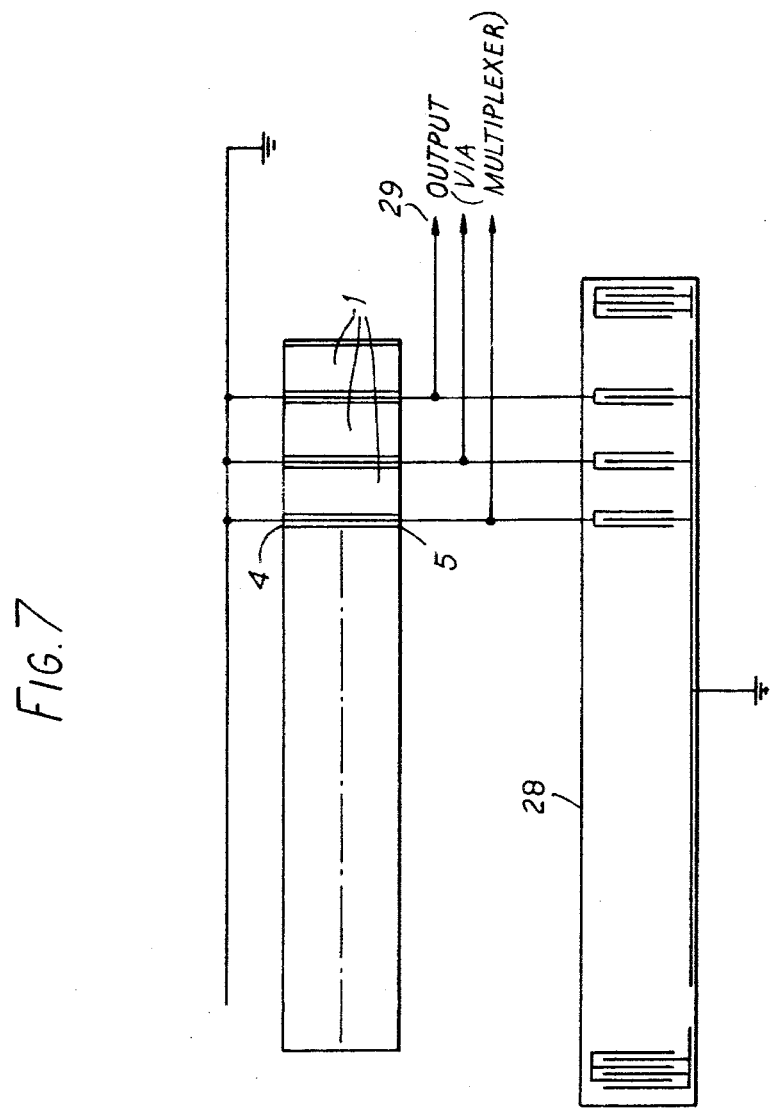

DETECTORS OF PENETRATING RADIATION

The present invention relates to the detection of penetrating radiation and relates especially, although not exclusively, to the detection of X-radiation.

Conventionally, radiographic apparatus has detected the intensity of X-radiation, after passage through the body of a patient, by exposure of suitable film. It has been known, however, to use other detectors such as fluoroscopic screens. In radiographic apparatus of the type known as computerised tomographic apparatus, X-rays are directed through the patient's body along many linear paths in a cross-section. The X-rays are then intercepted and their intensity measured by suitable detectors. Typically detectors for such apparatus are scintillator crystals which convert the radiation into visible light, the intensity of which is in turn measured by a photomultiplier or photodiode. The light detector then provides an output signal which is representative of the intensity of X-radiation incident on the scintillator crystal and which can then be processed to yield a representation of the variation of absorption of the radiation in the cross-section. Variations of the basic technique of computerised tomography and suitable processing methods are described in U.S. Pat. Nos. 3,778,614 and 3,924,129.

In United States Patent Application Ser. No. 832,605 there is described a detector which avoids the two-stage conversion of energy described above and converts the X-radiation directly into electrical signals. It is an object of this invention to provide an alternative form of X-ray detector giving such direct conversion.

According to the invention there is provided a detector, of penetrating radiation, including photoconductive material arranged to receive the radiation, means for applying to the material two electrical signals, means for deriving from the material an output signal which results from interrelation of the two signals, and which comprises a signal component proportional to the intensity of incident radiation and a background component independent of that intensity.

In order that the invention may be clearly understood and readily carried into effect it will now be described by way of example with reference to the accompanying drawings, of which:

Figure 2:
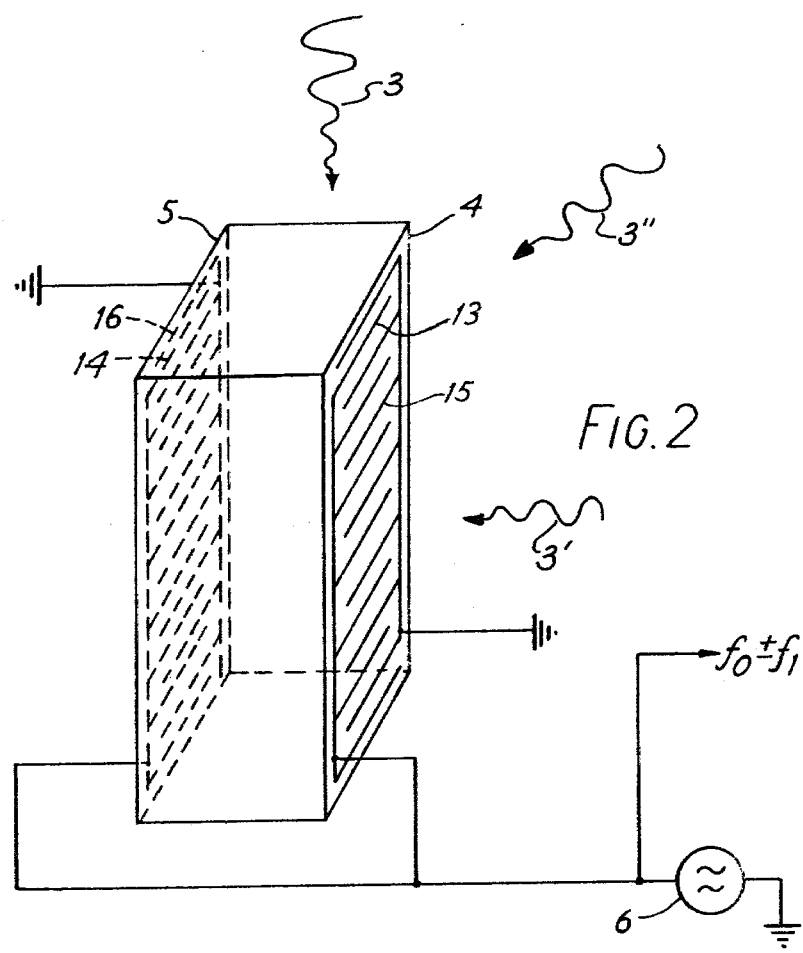
FIG. 2 shows an improved electrode arrangement for that detector.
Figure 3:
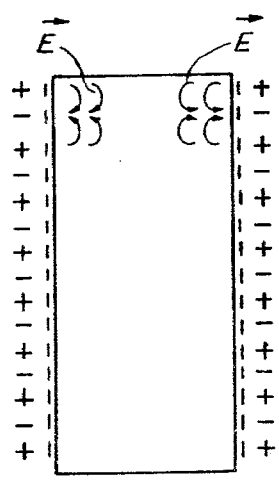
Figure 4:
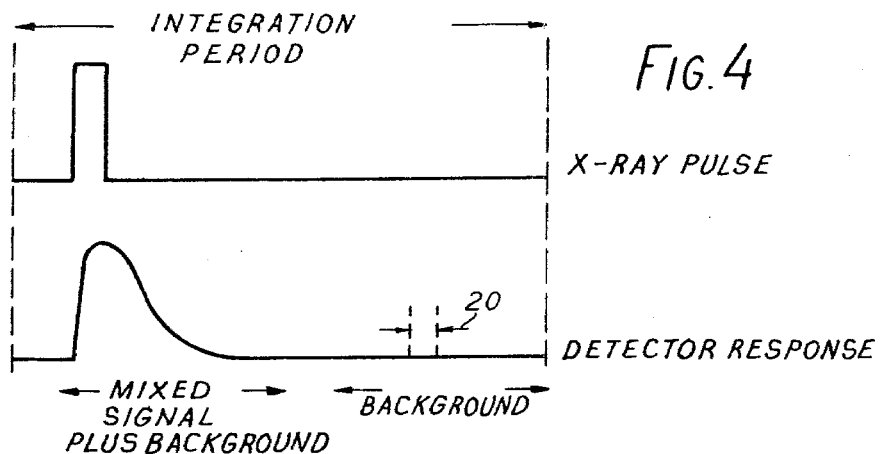
Figure 6:
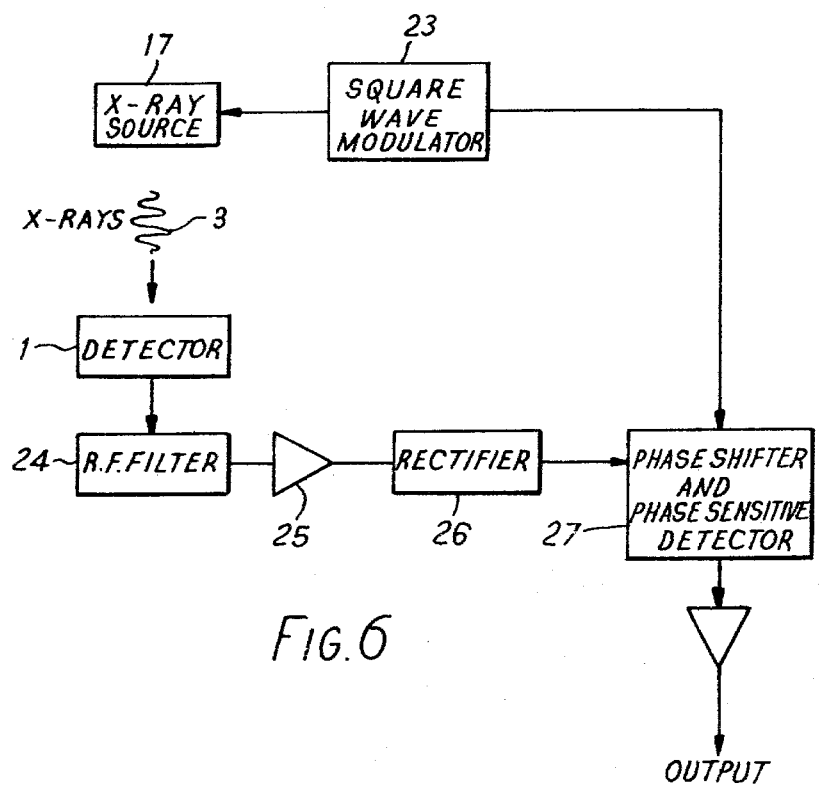

FIG. 3 shows the electric field provided in the detector by the electrode arrangement of FIG. 2, FIG. 4 is used to explain one mode of separating the background signal, FIG. 5 is a block diagram of an arrangement representing the signals as explained with reference to FIG. 4, FIG. 6 is a block diagram of an alternative arrangement for separating the background signal and FIG. 7 shows one form of detector array.

It has been found that, in a photo conductive material either semiconductor or insulator, two signals applied across the material will to some extent be mixed and that the mixed signal can then be measured independently of the applied signals. The mixing occurs in the presence of free charges and the extent of mixing is related to the number of free electrons present in the material.

Normally free electrons are present in the conduction band of insulators and semiconductors, the number of such thermally excited electrons being dependent on the magnitude of the forbidden energy gap. The presence of radiation, such as X-radiation, incident on the material increases the number of free charges and the distribution of electrons and thus increases the amplitude of the mixed signal. Thus the increase in amplitude of the mixed signal is representative of the intensity of the incident radiation and can be measured to provide the desired output signal.

The foregoing is a theory of the phenomenon, on which this invention is based, which is believed to be true. However, different principles may be involved and, in any case, the detector of this invention, which will now be described, works whether the principles of its operation are understood or not.

Figure 1:
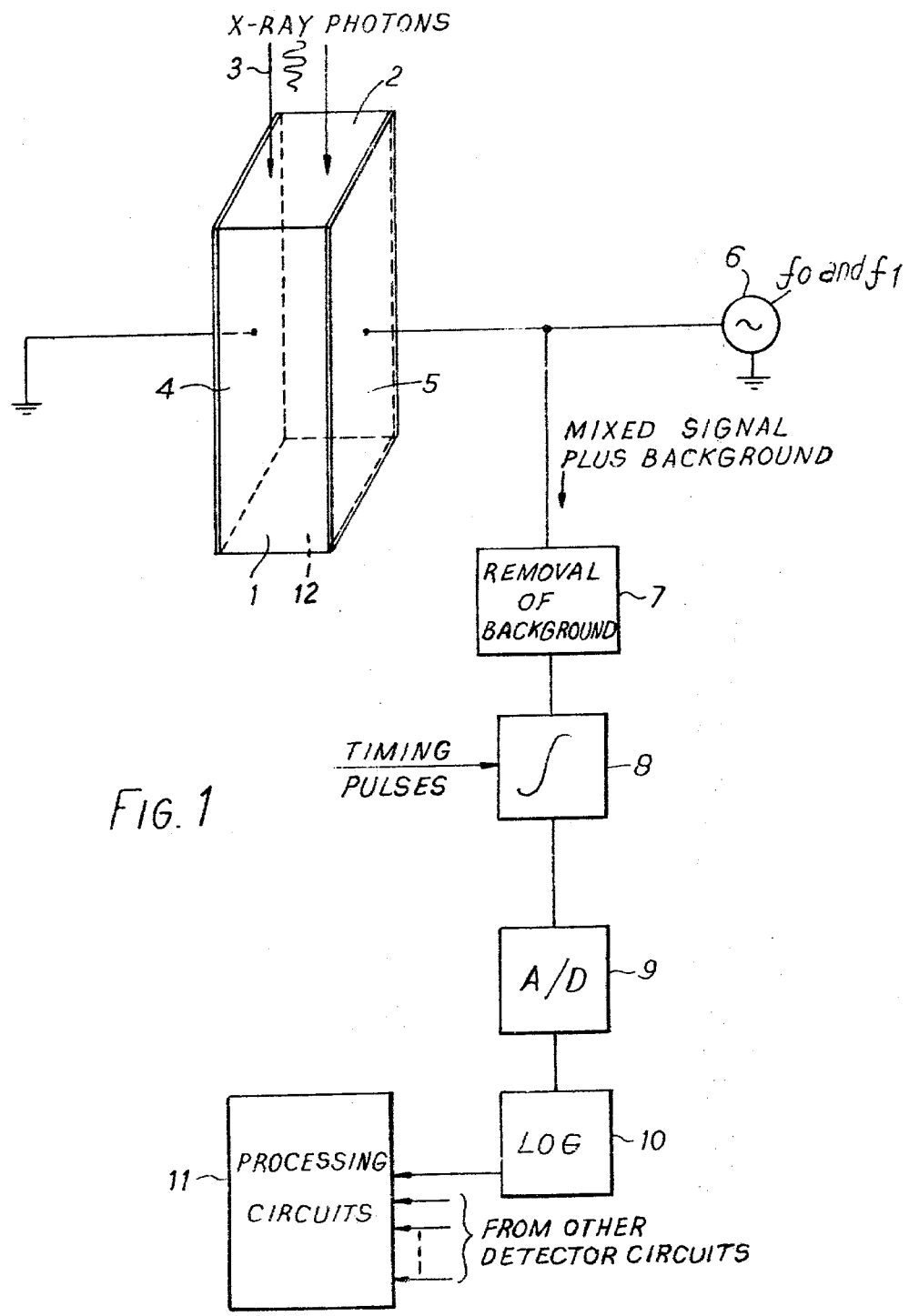
FIG. 1 shows a detector in accordance with the invention.

The arrangement is indicated generally in FIG. 1. A crystal 1 of the material is, in this example, of rectangular shape.

One surface 2 is then disposed to reduce the mixed X-rays 3. The material used may be chosen to receive the incident signal in the absence of incident radiation. To meet that criterion insulators are most suitable. However these do not produce sufficient free electrons per incident photon. The best choice is in practice a compromise between these two factors and suitable materials have been found to be Germanium, Cadmium sulphide, Gallium Arsenide and Mercuric Iodide, although other semiconductors may be used.

Two opposing surfaces of the crystal are provided with electrodes 4 and 5. In this example electrodes 4 and 5 are provided on surfaces perpendicular to face 2. In an alternative arrangement faces 2 and 12 may carry the electrodes. Electrode 4 is normally, but not necessarily, earthed as shown and the two input signals, $f_0$ and $f_1$ are applied to electrode 5 from oscillator circuits 6. The output signal of $f_0$ and $f_1$ mixed is also derived from electrode 5 and applied to circuits 7. The output comprises the dark output, which will be called background, and the mixed output resulting from the incident radiation, which will be called the mixed signal. Circuits 7, whose operation will be discussed in more detail hereinafter, are operative to remove the background component from the mixed signal. The mixed signal is amplified if necessary, in circuits not shown, and integrated for a chosen period in integrator 8.

For radiographic apparatus of the type disclosed in the said Patent specifications the integration is over a period determined by the operation of the apparatus and the circuit 8 is controlled by timing pulses provided by the apparatus. Also for such apparatus the signals are converted to digital form in circuits 9, to log form in circuits 10 and processed in circuits 11, together with signals from other detectors, to provide the desired representation. The operation of these circuits is described in more detail in the said Patent Specifications.

Considering now the separation of the background component from the mixed signals it will be seen that one way of effectively achieving this is to reduce the background to a negligible level. Choice of material has been mentioned hereinbefore but an alternative course is to cool the material since thermal excitation is, of course, greatly reduced at low temperatures.

The background signal may also be effected by the crystalline quality and the chemical purity of the detector material. Ohmic contact electrodes are sufficient for material of very high quality. For others, electrons may be injected into the material by trapping effects. The increase in background signal may be moderated by employing a surface barrier contact; placing a thin layer of insulating material between the photo-conductor and the electrode; or using a p.n. junction device instead of a homogeneous photoconductive material. A p.n. junction would be reverse biased and chosen to have a very wide depletion layer.

The dark signal and the irradiation signal may also be tailored by taking into account the symmetrical nature of the mixing interaction. The type of electrode to be used depends on the detector material and the detector requirements as may be seen from the following two examples.

The first example seeks to make the detector as symmetrical as possible. Two similar contacts, preferably capacitive, are used and minimum dark signal is then obtained. One electrode is carried on face 2 and the other on the opposing face 12. The radiation is absorbed exponentially between these two faces thus reducing the symmetry of the charge distribution in the material and consequently yielding an enhanced irradiation signal.

The second example uses an asymmetric arrangement. One contact is a capacitive contact and the other is an ohmic (or surface barrier) contact. The arrangement gives relatively large dark signals and the enhancement of the irradiation signal, due to reduced symmetry, is not as marked as in the symmetric case discussed hereinbefore. Such a detector can however be used if the dark signal due to thermal effects is negligible, where the dark signal can be considered negligible or insignificant if it is less than 10% of the photon noise, which is governed by well known statistics.

An alternative and improved electrode configuration is shown in FIG. 2. In this example the electrodes on faces 4 and 5 of the crystal are provided in the form of interdigitated fingers 13, 14, 15, 16. These are arranged so that the fingers on opposing faces are in phase and thus the electric fields produced are in a direction parallel to faces 4 and 5, as shown in FIG. 3. The two drive signals are applied to one set of fingers 13, 14 and the mixed signal is taken from the same set. The opposite set of fingers 15, 16 is normally earthed. Optimum inter electrode distance is dependent on the detector material, resistivity and mobility, on the drive voltage available and on the frequency of the drive signals and is chosen taking into account those factors. As with the arrangement of FIG. 1 the radiation may be incident perpendicular to faces 4 and 5 which carry the electrodes as at 3'. In that case greater sensitivity may be obtained. In general it may be incident at any intermediate orientation, as shown at 3''. This configuration has the advantage of allowing the use of materials with low X-ray absorption which would otherwise require large intermediate distances for the high symmetry detector described hereinbefore.

The interelectrode distance should preferably be less than 10% of the Debye length being given as $$\frac{D_p \epsilon_r \epsilon_0}{\rho_0 \mu_p}$$

in which $D_p$ is the diffusion constant
$\epsilon_r \epsilon_0$ are the dielectric constants
$\rho_0$ is the resistivity and
$\mu_p$ is the mobility.

Typically, for a detector of 1 mm width, the Debye length is 0.05 mm so that the interelectrode distance should be about 0.5 mm.

It should be noted that in FIGS. 2 and 3 the dimensions of the detector in relation to the interelectrode distance are not to scale in order to show more clearly the electrode configuration and electric field distribution.

Where the dark signal is of significant level it may be subtracted from the irradiation signal. For example the X-ray source may be pulsed, as shown in FIG. 4 to give a short pulse in each integration period. The irradiation signal (mixed plus background) and background signal are then provided by the same detector in the same integration period. Since the irradiation signal will be much larger than the background the latter can be subtracted by known analogue or digital means.

For example the two signals may be digitally converted, applied to a digital store and subtracted therein at the end of the integration period. Alternatively the total signal can be put into store and an average of the background subtracted.

A block diagram of such an arrangement is shown in FIG. 5. An X-ray source 17 is pulsed, as shown in FIG. 4, by pulses from a pulse generator 18. The X-rays are incident on detector 1 and the output is applied to integrator 8 and A/D as in FIG. 1, but via a gate 19 opened by the pulses which control source 1 to pass the output only during the source pulse. The output is also applied to integrator 8' and A/D 9' via another gate 19'. Gate 19' is opened by pulses from generator 18, in this case pulses which open the gate at a time, such as 20 indicated in FIG. 4, when there is only background signal. The total signal from 9 and the background from 9' are held in a store and subtractor 21 which provides their difference, representing the mixed signal, at 22 for further processing as before.

It should be noted that a suitable X-ray count is required in each integration period so that for a chosen dose the maximum tube power governs the minimum pulse width achievable. However the detector must be allowed to recover before the background can be measured. If the background does not vary with time excessively, it can be averaged over several, say, ten integration periods thus improving the signal to noise ratio.

Alternatively signal retrieval methods, such as lock-in amplification, may be used. In this method the X-ray beam is modulated at a reference frequency, say by use of control grid in the tube gun. The mixed signal is then similarly amplitude modulated although the background is not. A suitable circuit is shown in block diagrammatic form in FIG. 6. A square wave modulator 23 modulates the output of X-ray tube 17 with a sufficiently high frequency that several pulses are present in each integration period. The X-rays are then incident as before on detector 1 which is of a material chosen to have an electron recombination time short enough not to mask the modulation. The signal is RF filtered at 24 and amplified at 25 before being applied to a rectifier 26. The signal is then compared with the output of 23 in phase sensitive detector circuits 27. The output of circuits 27 represents only those signals which are in phase (coherent) with the reference signal, thus eliminating the background.

Normally the background will have no variation with time although some increase with time may be caused by trapping. This effect however has a very long time constant of the order of several minutes.

Other methods of separation, such as pulse coding may be used if desired. Other embodiments of the invention and choices of detector material will be apparent to those skilled in the art.

In particular it is not necessary for the input signals to be at different frequencies as described hereinbefore. If they are of the same frequency an harmonic thereof may be detected as the mixed signal.

The detector described has a spatial resolution limited by its physical size. For detection of radiation over larger areas, as required for computerised tomographic apparatus, an array of detectors, is used and may be as shown in FIG. 7. In that arrangement the array of detectors is accessed as shown from a surface acoustic wave delay line 28. The output is taken at 29 via a multiplier, not shown. As an alternative to the surface acoustic wave delay line, a charge coupled device delay line may be used.

What we claim is:

1. A detector, of penetrating radiation, including photoconductive material arranged to receive the radiation, means for applying to the material two electrical signals at respective frequencies, means for deriving from the material an output electrical signal at a frequency different from said respective frequencies, which results from interrelation of the two applied signals, and which comprises a signal component which is a function of the intensity of incident radiation and a background component which is substantially independent of that intensity.

2. A detector according to claim 1 including means for substantially removing the background component from the output signal to leave the signal component.

3. A detector according to claim 2 including means for determining the background component and means for subtracting it from the output signal.

4. A detector according to claim 3 including means for selectively interrupting said radiation and means for determining the background component while the signal component is reduced substantially to zero by said interruption 5. A detector according to claim 2 including means for modulating said radiation, and therefore modulating the signal component, and means for separating the modulated signal component from the unmodulated background component.

6. A detector according to claim 1 in which the means for applying said electrical signals comprise a set of one or more contacts on each of two opposing surfaces of said material between which both of said electrical signals are applied.

7. A detector according to claim 1 in which the means for applying said electrical signal comprise opposing contacts on each of two opposing surfaces of said material wherein both electrical signals are applied between the contacts on each said surface.

8. A detector according to claim 7 in which the electrodes on each said surface comprise two sets of interdigitated parts, both said signals being applied between the two sets.

9. A detector according to either of claims 7 or 8 in which the contacts on one surface are related to the contacts on the other surfaces to cause the electric fields produced thereby on the opposing surfaces to be in phase.

10. A detector according to claim 6 in which the opposing contacts are of dissimilar type.

11. A detector according to claim 6 in which the opposing contacts are of the same type.

12. A detector according to claim 7 in which the opposing contacts are of the same type.

13. A detector according to any one of claims 10-12, in which at least one of the contacts is capacitive.

14. A detector according to any one of claims 10-12 in which at least one of the contacts is ohmic.

15. A detector according to any one of claims 10-12 in which at least one of the contacts is a surface barrier contact.

16. A detector according to claim 1 in which the material is Germanium.

17. A detector according to claim 1 in which the material is Cadmium sulphide.

18. A detector according to claim 1 in which the material is Gallium Arsenide.

19. A detector according to claim 1 in which the material is Mercuric Iodide.

20. A detector according to claim 1 in which the detector material includes a p.n. junction.

21. A detector according to claim 1 in which the two electrical signals are of different frequencies.

22. A detector according to claim 1 in which the two electrical signals are of the same frequency and the output signal is an harmonic thereof.

23. An array of detectors of penetrating radiation each detector including: photoconductive material arranged to receive the radiation; means for applying to the material two electrical signals at respective frequencies; means for deriving from the material an electrical output signal at a frequency different from said respective frequencies, which results from the interrelation of the two applied signals, and which comprises a signal component proportional to the intensity of incident radiation and a background component independent of that intensity.

24. An array of detectors according to claim 23 in which said electrical signals are applied via a surface acoustic wave delay line.

25. An array of detectors according to claim 23 in which said electrical signals are applied via a charge coupled device delay line.

26. A detector, of penetrating radiation, including photoconductive material arranged to receive the radiation, means for applying to the material an electrical signal at a first frequency, means for deriving from the material an output signal at a second frequency which is an harmonic of the first frequency and which comprises a signal component proportional to the intensity of the incident radiation and a background component independent of that intensity.

27. A detector of penetrating radiation including photoconductive material arranged to receive the radiation, means for applying to the material an electrical signal at a chosen frequency and means for deriving from the material an output signal resulting from an interrelation between the signal applied and the incident radiation and not at the chosen frequency, to be indicative of the intensity of the incident radiation.

* * * * *

UNITED STATES PATENT AND TRADEMARK OFFICE
CERTIFICATE OF CORRECTION

PATENT NO. : 4,255,660
DATED : March 10, 1981
INVENTOR(S) : Steven James Blundell and Charles William Turner It is certified that error appears in the above-identified patent and that said Letters Patent are hereby corrected as shown below:

Column 2, line 21, delete "reduce the mixed" and insert -- receive the incident --.

Column 2, line 22, delete "receive the incident" and insert -- reduce the mixed --.

Signed and Sealed this

Ninth Day of February 1982

[SEAL]

Attest:

Attesting Officer

GERALD J. MOSSINGHOFF

Commissioner of Patents and Trademarks